United States Patent [19]
Ishii

[11] Patent Number: 4,875,163
[45] Date of Patent: Oct. 17, 1989

[54] ELECTRONIC CASH REGISTER SYSTEM WITH FASTER ACCESS TIME TO PRICE LOOK-UP FILE

[75] Inventor: Hiroaki Ishii, Ohtsu, Japan

[73] Assignee: Omron Tateisi Electronics Co., Kyoto, Japan

[21] Appl. No.: 95,625

[22] Filed: Sep. 14, 1987

[30] Foreign Application Priority Data

Sep. 22, 1986 [JP] Japan .................................. 61-224355
Sep. 24, 1986 [JP] Japan .................................. 61-227000

[51] Int. Cl.$^4$ .............................................. G06F 15/00
[52] U.S. Cl. ...................................... 364/405; 235/385
[58] Field of Search ...................... 364/404, 405, 406; 235/375, 383, 385

[56] References Cited

U.S. PATENT DOCUMENTS 4,509,129 4/1985 Yatsunami et al. ................... 364/405
4,679,154 7/1987 Blanford .............................. 364/405
4,751,641 7/1988 Collins, Jr. et al. ................. 364/405
4,752,875 6/1988 Takebayashi ....................... 364/405
4,757,448 7/1988 Takagi ................................. 364/405

Primary Examiner—A. D. Pellinen
Assistant Examiner—Jeffrey A. Gaffin
Attorney, Agent, or Firm—Stevens, Davis, Miller & Mosher

[57] ABSTRACT

An electronic cash register system which includes a memory for temporarily storing item data retrieved from a price look up file. When an article subsequently is processed by the electronic cash register, which is of the same class as an article previously processed by the electronic cash register and having its item data stored in the temporary storage medium, the temporary storage medium is accessed for the item data, thus eliminating the need to access the price look up file for that same type of article.

14 Claims, 8 Drawing Sheets

ELECTRONIC CASH REGISTER SYSTEM WITH FASTER ACCESS TIME TO PRICE LOOK-UP FILE

BACKGROUND OF THE INVENTION

1. Field of the Invention

The present invention relates to an electronic cash register (ECR) system, and more particularly, to ECR systems of the type which include a price look-up (PLU) file which stores item data such as PLU codes, unit prices and other data for different kinds or classes of articles to be processed by the ECR, where the PLU file is accessed and data retrieved therefrom when an article is processed by the ECR.

2. Discussion of the Prior Art

Prior art ECRs have employed PLU files for storing item data such as PLU codes, unit prices and miscellaneous data for different kinds of articles to be processed by the ECR. The PLU file is accessed each time an article is registered by the ECR. This is time-consuming, and it would be advantageous to decrease the required access time to the PLU file. In addition, the requirement to access the PLU file each time an article is encountered results in increased errors.

SUMMARY OF THE INVENTION

It is an object of the present invention to provide an improved ECR system with decreased access time to a PLU file.

The present invention includes a means for searching the PLU file to retrieve item data corresponding to a succession of particular articles being processed by the ECR and storing the item data corresponding to the particular articles in a temporary storage segment of a memory internal to the ECR. The temporary storage segment includes one or more storage areas for the item data. If only one storage area exists, the item data therein is erased and updated for each article processed by the ECR. If plural storage areas exist, item data for a succession of articles is entered until each of the storage areas is full, and thereafter, when successive articles are processed, item data is erased from particular storage areas in accordance with a priority scheme described below in order to provide space in the temporary storage segment for these successive articles. When an article of the same class as an article for which item data was previously stored in the memory segment is subsequently presented for processing by the ECR, the internal memory area is accessed and a display and printing operation based on this data in the temporary storage segment is carried out.

According to the present invention, there is provided an electronic cash register system which includes a PLU file which stores item data corresponding to different classes of articles to be processed by the ECR system, where the item data comprises at least a PLU code and an item price. Each particular article to be processed is within one of the classes of articles so that all particular articles within a particular class have the same item data (PLU code and item price). A temporary storage means is provided for receiving from the PLU file and temporarily storing item data corresponding to the different classes of articles to be processed by the ECR system. An accessing means is provided for accessing the item data stored in the temporary storage means when a present particular article being processed by the ECR system is within a same class of articles as a preceding article processed by the ECR system and having its item data stored in the temporary storage means. An output means, responsive to the item data accessed by the accessing means, provides an output representation of at least the item price data.

More particularly, according to the present invention, an electronic cash register system is provided which includes a PLU file as described above and an input means for entering into the ECR system PLU codes of a succession of particular articles as they are being processed by the ECR system, with the input means including means for providing an indication that a particular present article being processed is within the same class of articles as a preceding article processed by the ECR system and having its item data stored in the temporary storage means. A retrieval means, responsive to entry of the PLU codes by the input means, searches the PLU file to retrieve item data stored in the PLU file corresponding to the succession of particular articles being processed. A temporary storage means, responsive to the retrieval means, receives and temporarily stores in order the item data retrieved by the retrieval means such that item data corresponding to at least one of the particular articles is stored at any particular time in the temporary storage means. An accessing means, responsive to the indication that a present article is within the same class as a preceding article, accesses the item data relating to the preceding article stored in the storage means. An output means, responsive to the item data accessed by the accessing means, provides an output representation of at least the item price data. According to this embodiment, the input means can comprise a keyboard having keys for designating a PLU code and a repeat key means on the keyboard for providing an indication that the present article is within the same class as a preceding article. The storage means can comprise plural storage areas for storing simultaneously item data corresponding to plural ones of the classes of particular articles. The system can also include a counter associated with each of the plural storage areas, where the counters are incremented one count in response to the input means entering a PLU code corresponding to a class of articles the item data of which is previously stored in its associated memory. The ECR system can further include a detection means for determining (a) whether all of the plural storage areas have item data stored therein and (b) in response to a determination that all of the plural storage areas have item data stored therein, determining one of (1) which of the counters has the lowest count and (2) whether two or more of the counters have equally lowest counts and in response to a determination that two or more of the counters have equally lowest counts, determining which memory area of the memory areas associated with the two or more counters of equally lowest count contains earliest stored item data. The ECR system further includes an erasing means, responsive to the detection means, for erasing one of (1) the memory area associated with the single counter determined to have the lowest count, (2) the memory areas associated with the two or more of said counters which have equally lowest counts and (3) the memory area of the memory areas associated with the two or more counters of equally lowest count which is determined by the detection means to have earliest stored item data therein.

According to another aspect of the present invention, there is provided an ECR system which includes a PLU file as described above and an input means for entering into the ECR system PLU codes of a succession of particular articles as they are being processed by the ECR system. A retrieval means, responsive to entry of the PLU codes by the input means, searches the PLU file to retrieve item data stored in the PLU file corresponding to the succession of particular articles. A temporary storage means, responsive to the retrieval means, receives and temporarily stores in order the item data retrieved by the retrieval means such that item data corresponding to at least one of the particular articles is stored at any particular time. A judgement means, responsive to the input means, determines whether a particular present article being processed is within the same class as a preceding article processed by the ECR system and having its item data stored in the temporary storage means. An accessing means, responsive to a determination by the judgement means that a present article is within the same class as a preceding article, accesses the item data relating to the preceding article stored in the storage means. An output means, responsive to the item data relating to the preceding article accessed by the accessing means, provides an output representation of at least the item price data. The input means can comprise a bar code scanner means for scanning bar codes associated with each of the articles, and the judgement means can further comprise comparison means, responsive to the scanner means, for comparing a PLU code of a present article with a PLU code of a preceding article, to determine whether the present article is within the same class as the preceding article. The storage means can comprise plural storage areas for storing simultaneously item data corresponding to plural ones of the classes of particular articles. This embodiment can also include storage areas with counters associated therewith, a detection means and an erasing means as described above.

BRIEF DESCRIPTION OF THE DRAWINGS

The above and other objects advantages and features of the present invention will be more fully understood when considered in conjunction with the following figures of which.

DETAILED DESCRIPTION OF THE INVENTION

Figure 1:
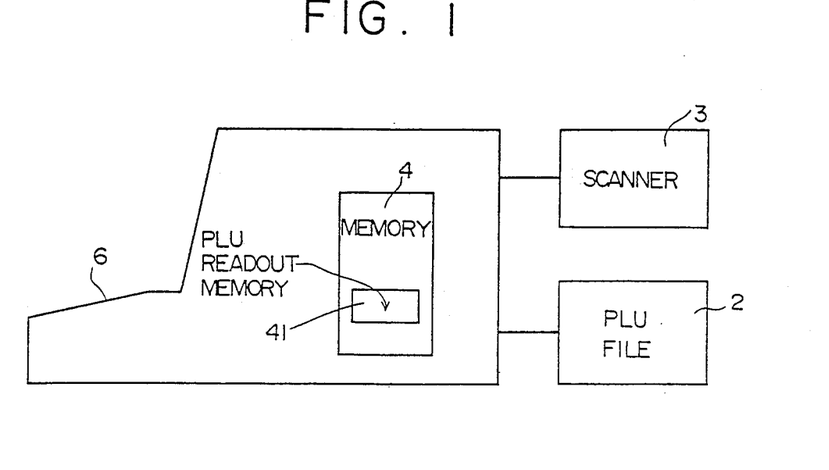
FIG. 1 shows the ECR system according to the present invention in block diagram form.

FIG. 1 shows an ECR 1 connected to a bar code scanner 3 for reading data from a bar code imprinted on articles to be registered or processed by ECR 1 and for transmitting this data to ECR 1. ECR 1 is also connected to a PLU file 2 containing item data, such as PLU codes, unit prices and miscellaneous other data, corresponding to articles to be processed by the ECR system. ECR 1 includes a memory 4, which contains a PLU read-out temporary memory segment 41 and a keyboard 42. It should be noted that each particular article to be processed by ECR 1 falls generically within a "class" of articles, and all particular articles within a same "class" will have the same item data (PLU code and item price).

Figure 2:
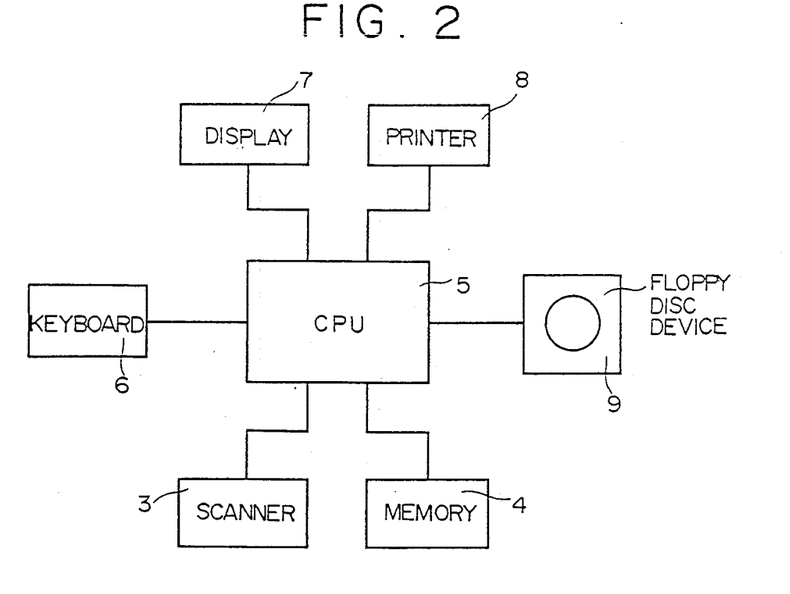
FIG. 2 illustrates an ECR system according to the invention in more detailed block diagram form.

FIG. 2 shows ECR system 1 in more detail and in block diagram form, including a CPU 5, a memory 4 internal to the ECR 1, a bar code scanner 3, a floppy disk device 9 for storing a PLU file 2, a printer 8, a display device 7 and a keyboard 6.

Figure 3:
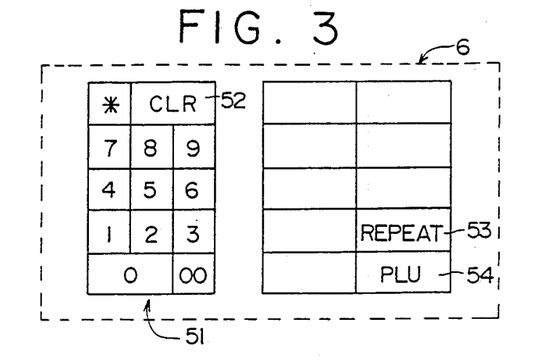
FIG. 3 illustrates a keyboard of an ECR system according to the present invention.

FIG. 3 illustrates keyboard 6 in more detail. The keyboard has an area 51 containing numeral keys 0-9 for entry of a multi-digit PLU code, a clear key 52, a repeat key 53 and a PLU key 54, the operation of which is described in detail below.

Figure 4:
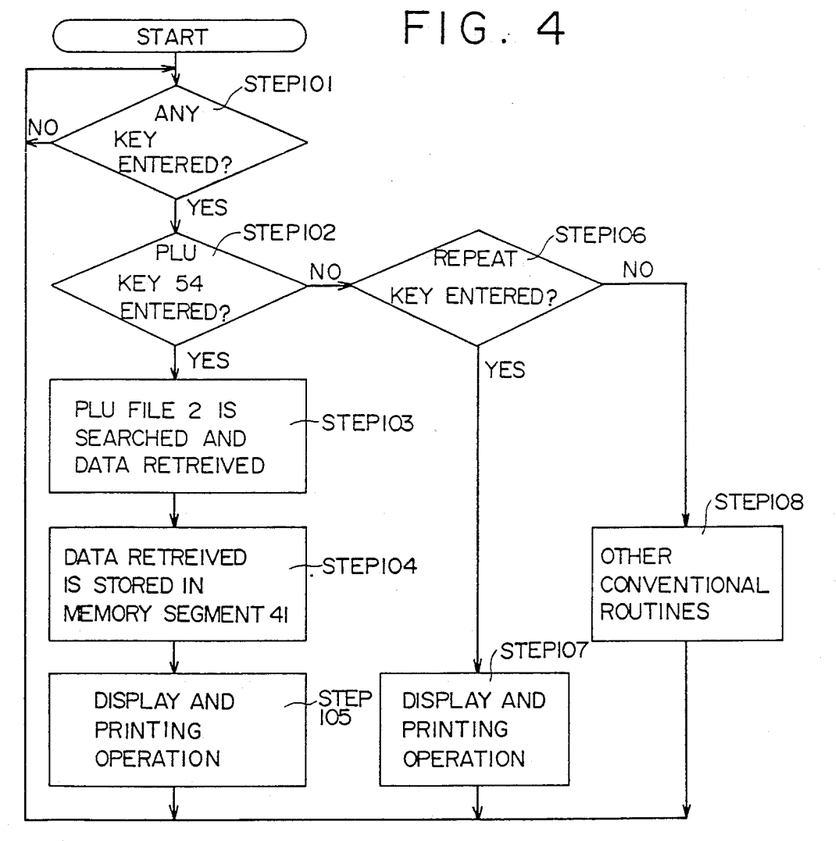
FIG. 4 is a flowchart illustrating a first embodiment according to the present invention.

FIG. 4 is a flowchart of the operation of the system according to a first embodiment of the invention. In this embodiment, when an article is to be processed by ECR 1, either (1) a PLU code is entered using keys 51 and PLU key 54 is actuated, or (2) where an article of the same class has been previously processed and item data relating thereto (i.e., PLU code, item price and miscellaneous data) has been entered in temporary memory segment 41, a repeat key 53 is actuated to indicate that memory segment 41 should be addressed and accessed rather than PLU file 2.

Figure 8:
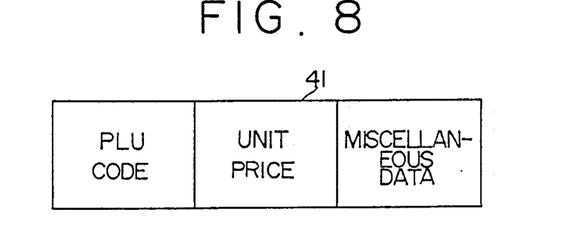
FIG. 8 illustrates one embodiment of a PLU read-out memory.

It should be noted that memory segment 41 can, as shown in FIG. 8, contain storage space for storing only item data for a single article wherein the item data in memory segment 41 is updated each time a new article is processed by retrieving the item data associated with this new article from PLU file 2, erasing the contents of memory segment 41 and entering this new item data into memory segment 41. As a result, when a memory segment 41, as in FIG. 8, is employed, data will be retrieved from memory segment 41 only if an immediately preceding article is encountered which is of the same class as that currently being processed. In other words, there can be no skips between articles of the same class to gain the benefit of using memory segment 41.

Figure 9:
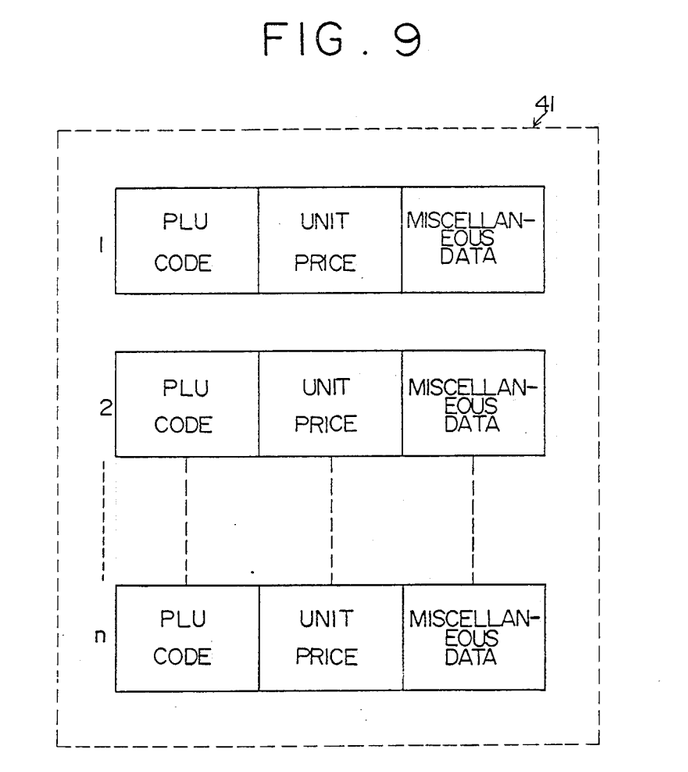
FIG. 9 illustrates another embodiment of a PLU read-out memory.

Alternatively, a memory segment 41, as shown in FIG. 9, can be used. This type of memory contains plural storage areas 1, 2, ... n for storing item data corresponding to plural ones of the classes of particular articles to be processed. When this type of memory is used, memory segment 41 can be used to store data for many successive articles, so that its data can be accessed even if an article of the same type was processed by ECR 1 several articles prior to the current article.

Returning again to the flowchart shown in FIG. 4, the embodiment illustrated therein applies to use of a keyboard 6 with a memory 41 as in FIG. 8. In step 101 of FIG. 4, a determination is made as to whether any key of keyboard 6 has been actuated. If no, the system repeats step 101. If yes, at step 102, a determination is made as to whether PLU key 54 has been actuated. If yes, control operation procedes to steps 103-105. Thus, at step 103, PLU file 2 is addressed and searched for item data (PLU code, unit price and miscellaneous other data) corresponding to the PLU code entered at keyboard 51. This data is retrieved and, in step 104, is stored in memory segment 41 of ECR memory 4. Then, in step 105 a display and printing operation is performed on the data retrieved in step 103. It should be noted that in step 105, the display and printing operation can be performed directly on the data received from PLU file 2 or, alternatively, it can be performed on data retrieved from memory segment 41 after such data has been stored therein in step 104. If the determination at step 102 is negative, operation procedes to step 106. At step 106, a determination is made as to whether repeat key 53 has been actuated. If yes, data relating to the PLU code for the given article previously stored in memory segment 41 is retrieved from memory segment 41. A display and printing operation is carried out based on this retrieved data. If, however, at step 106, a determination is made that repeat key 53 has not been actuated, the control operation procedes to step 108 where other conventional routines are carried out.

Figure 5:
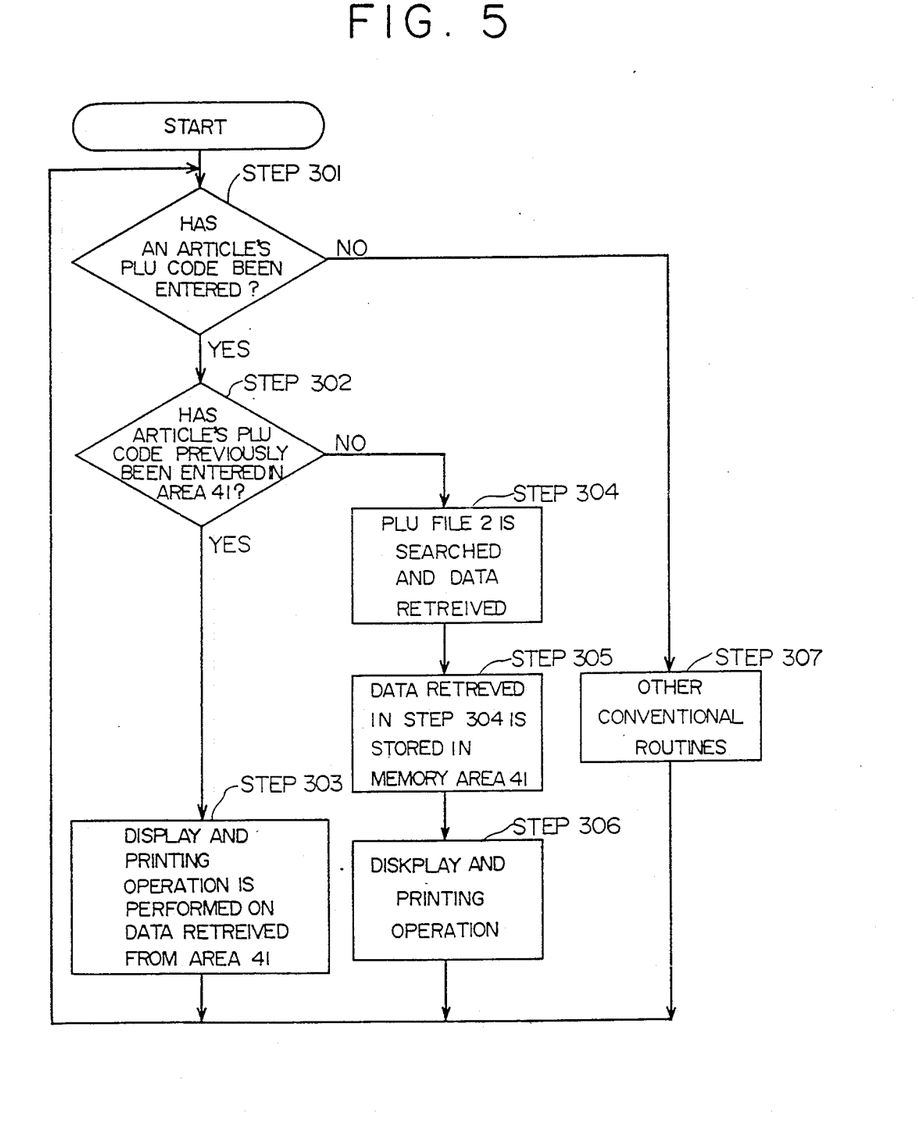
FIG. 5 is a flowchart illustrating a second embodiment according to the present invention.

FIG. 5 illustrates a second embodiment of the invention, wherein a keyboard is used to enter the PLU code of the particular articles to be processed and wherein memory segment 41 contains, as shown in FIG. 9, plural storage areas for storing item data corresponding to plural ones of the classes of particular articles to be processed by the ECR system. This embodiment is identical to that of FIG. 4, except that the repeat key 53 is actuated whenever an article is encountered, which is of the same class as that of any previous article encountered, which has its item data stored in memory segment 41.

Both of the FIGS. 4 and 5 embodiments reduce the access time to PLU file 2 by using repeat key 53 thereby accessing memory segment 41 when a repeat article is processed. When many items and customers must be serviced, the savings in retrieval time is significant. This reduces customer waiting time, thus improving the service to the customers. Further, since the number of access operations to PLU file 2 is decreased, this decreases the number of accessing errors which occur.

Figure 6:
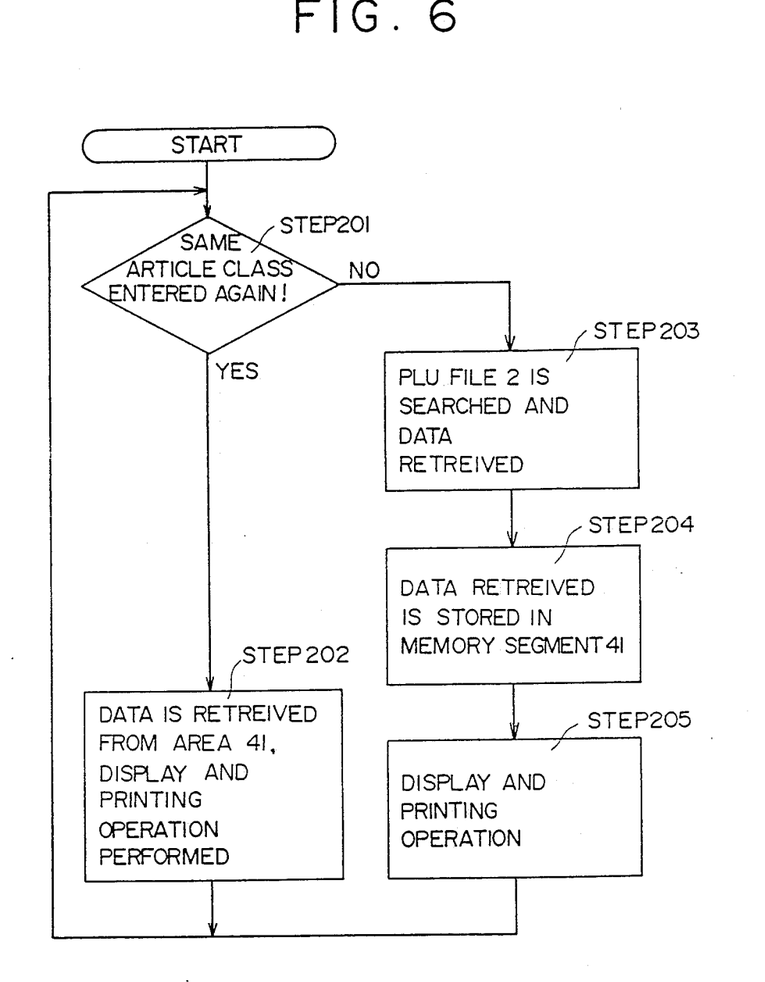
FIG. 6 is a flowchart illustrating a third embodiment according to the present invention.

Turning now to the FIG. 6 embodiment, FIG. 6 contains a flowchart representing a third embodiment of the invention, wherein a scanner 3 is used to read a PLU code from a bar code imprinted on an article (or its package) to be processed. In this embodiment, since scanner 3 is employed, repeat key 53 is not used. Instead, a CPU 5 receives the PLU code from scanner 3 to determine whether an article currently being processed is of the same class as an immediately preceding article. More particularly, according to this embodiment, in step 201, a determination is made as to whether an article within the same class as the immediately preceding one is being entered again by scanner 3. If yes, control operation procedes to step 202, where memory segment 41 is employed to retrieve item data (PLU code, item price and other data) stored for the previous article of the same class. This retrieved data is then used to perform a printing and display operation. Thus, there is no need to access PLU file 2 again for this same article. If step 201 is "no," control operation procedes to step 203 to search PLU file 2 and to retrieve therefrom item data (PLU code, unit price and other data) corresponding to the PLU code scanned on the present article by scanner 3. In step 204, the data retrieved in step 203 is stored in memory segment 41. In step 205, a display and printing operation is performed on the data retrieved in step 203. It should be noted that in step 205, the display and printing operation can be performed directly on the data received from PLU file 2, or it can be performed on data retrieved from memory segment 41, after such data has been stored therein in step 204.

Figure 7:
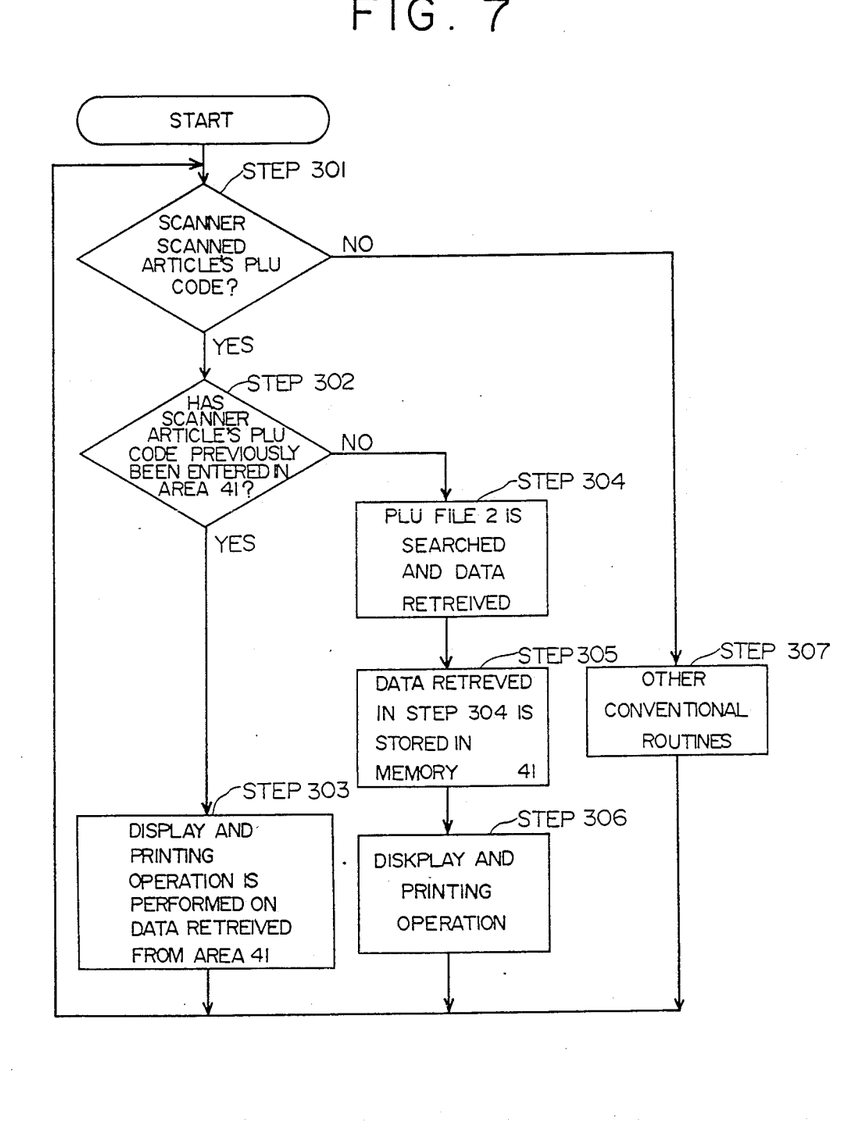
FIG. 7 is a flowchart illustrating a fourth embodiment according to the present invention.

FIG. 7 is a flowchart representing a fourth embodiment of the invention, which is related to that of the FIG. 6 embodiment. In the fourth embodiment, a memory configuration map as in FIG. 8 is employed. This embodiment is identical to that of FIG. 6, except that a memory segment 41 having plural storage areas for storing item data corresponding to plural classes of particular articles is used. Accordingly, in this embodiment, CPU 5 receives the PLU code from scanner 3 to determine whether the item currently being processed is within the same class as any preceding article which has had its item data entered in memory segment 41.

Figure 10:
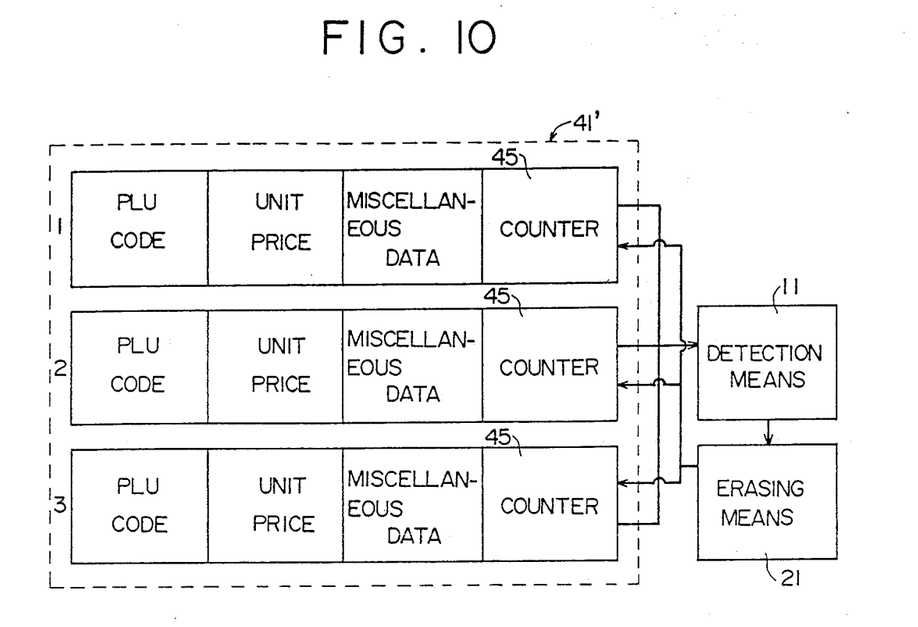
FIG. 10 shows a modified embodiment of the present invention in block diagram form.

FIG. 10 shows a modified memory segment 41', having, e.g., three storage areas wherein each of the storage areas has associated therewith a counter 45. Counters 45 count the number of times an item of the same class has been scanned or entered by the keyboard. Thus, a counter 45, in response to the scanner or keyboard entering a PLU code corresponding to a type of article whose item data has already been stored in its associated memory area, is incremented one count. Detection means 11 determines when all of the storage areas within memory segment 41 are full, giving rise to the need to erase at least one of the storage areas to make room for item data of a newly encountered article class. If all storage areas are full, detection means 11 then determines (1) which storage area has the lowest count in its counter 45 and (2) if two or more counters have equally low counts. Erasing means 21 functions such that (1) in response to a determination by the detection means that all storage areas are full and in response to an indication from detection means 11 specifiying which storage area has the lowest count associated therewith, erases this memory area, and (2) in response to a determination by detection means 11, that all storage areas are full and an indication that two or more counters have equally lowest counts, performs an erasing procedure comprising either erasing (1) the two or more memory areas associated with the counters having the equally lowest counts or (2) the particular memory area associated with the counters having the lowest count, in which item data was first stored. Thus, according to the structure shown in FIG. 10, the memory area storing the item data associated with a type of article encountered least frequently can be erased, so that the item data for the more popular articles are retained in memory segment 41', thus further enhancing the efficiency of the overall system.

Figure 11:
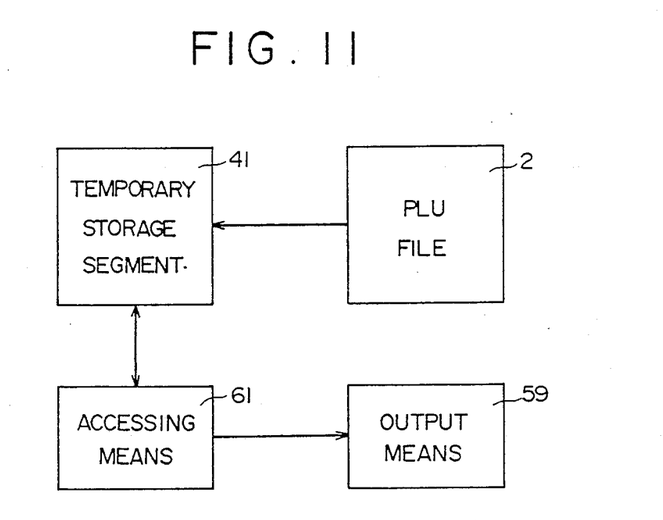
FIG. 11 is a block diagram illustrating the general features of the present invention.

FIG. 11 is a block diagram illustrating the general features of the present invention. Temporary storage means 41 temporarily stores item data which it has received from PLU file 2, corresponding to different classes of articles to be processed by the ECR system. Accessing means 61 accesses the item data stored in temporary storage means 41 when a present particular article being processed by the ECR system is within the same class of articles as a preceding article processed by the ECR system and having its item data stored in the temporary storage means. Output means 59 receives the item data accessed by accessing means 61 and provides an output representation of at least the item price data corresponding to the article being processed.

Figure 12:
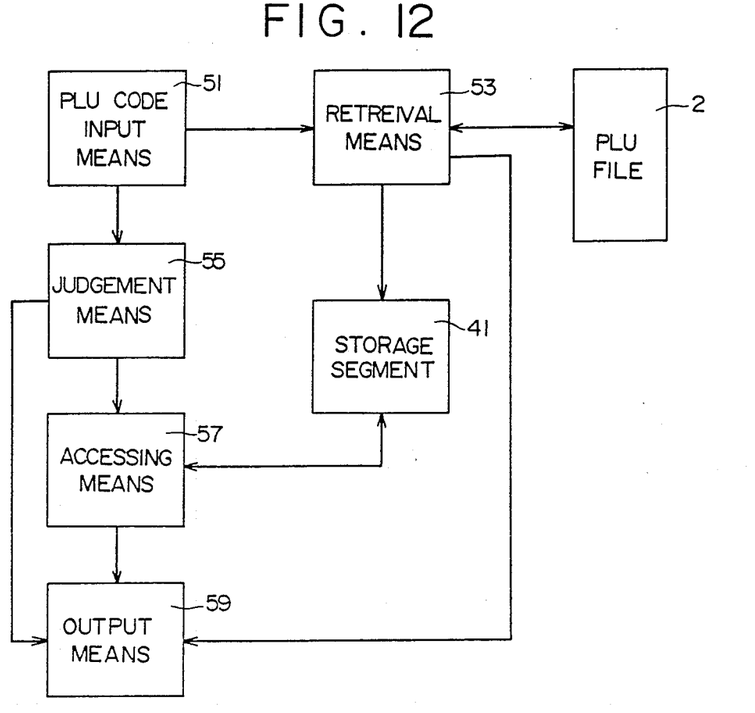
FIG. 12 is a block diagram illustrating the general features of the embodiment of the invention employing a bar code scanner means.

FIG. 12 is a block diagram illustrating the embodiment which employs a bar code scanner means or the like to enter the PLU codes. PLU code input means 51 (e.g., a bar code scanner) enters into the ECR PLU codes of a succession of particular articles as they are being processed by the ECR system. A retrieval means 53, responsive to entry of the PLU codes by input means 51, searches PLU file 2 to retrieve item data stored therein corresponding to the succession of particular articles processed by the ECR system. Temporary storage segment 41, responsive to retrieval means 53, receives and temporarily stores in order item data retrieved by retrieval means 53 such that item data corresponding to at least one of the particular articles is stored in segment 41 at any given time. Judgment means 55, responsive to input means 41, determines whether a particular article being processed is within the same class as a preceding article processed by the ECR system and having its item data stored in the temporary storage segment 41. Accessing means 57, responsive to a determination by judgment means 55 that a present article is within the same class as a preceding article, accesses the item data stored in storage segment 41. Output means 59 comprises a first means, responsive to the item data relating to the preceding article accessed by the accessing means, for providing an output representation of at least the item price data corresponding thereto. Output means 59 also comprises a second means, responsive to a determination by the judgment means that a present article being processed is not within the same class as an article previously processed by the ECR system, for receiving item data relating to the present article retrieved by the retrieval means to provide an output representation of at least the item price data relating to the present article.

Figure 13:
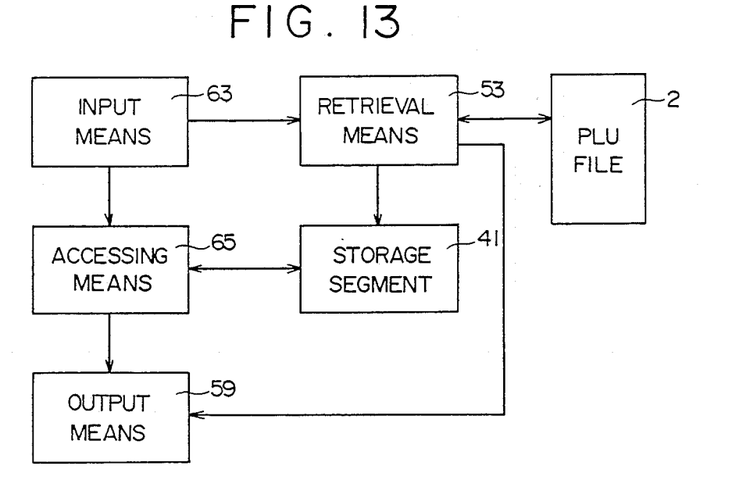
FIG. 13 is a block diagram illustrating the general features of the embodiment of the invention employing a keyboard for entering PLU codes into the ECR system and a repeat key for indicating that a present article is within the same class as a preceding article processed by the ECR system.

FIG. 13 is a block diagram illustrating the embodiment which employs a keyboard means or the like, with alphanumeric keys for entering PLU codes and a repeat key. PLU file 2 stores item data corresponding to different classes of articles to be processed by ECR 1. Input means 63 (e.g., a keyboard) enters into the ECr PLU codes of a succession of particular articles as they are being processed by the ECR system. The input means also includes a repeat key which the operator pushes to provide an indication that the present article being processed is within the same class as a prededing article. A retrieval means 53, responsive to entry of one of the PLU codes by input means 63, searches PLU file 2 to retrieve item data stored in PLU file 2 corresponding to the succession of particular articles processed by the ECR. Temporary storage segment 41, responsive to retrieval means 53, receives and temporarily stores in order item data retrieved by retrieval means 53 such that item data corresponding to at least one of the particular articles is stored in segment 41 at any given time. If a single memory array (FIG. 8) is used, only one piece of item data for one class of articles can be stored in segment 41 at a time. If a plural memory array (FIG. 9) is used, n pieces of item data can be stored simultaneously in segment 41. In either case, when segment 41 is full, all (FIG. 8) or part of (FIG. 9) the previously stored item data must be erased to make room for item data relating to the present article being processed by the ECR. It therefore should be noted that each article being processed by the ECR will have its item data stored in memory segment 41 for at least some time period. Accessing means 65, responsive to an indication that a present article is within the same class as a preceding article, accesses the item data stored in storage segment 41. Output means 59 comprises a first means, responsive to the item data accessed by accessing means 57, for providing an output representation of at lease the item price data. Output means 59 also comprises a second means, responsive to an indication from input means 63 that a present article being processed is not within the same class as an article previously processed by the ECR, receives the item data retrieved by retrieval means 53 from PLU file 2 to provide an output representation of the item data.

The above description and accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

I claim:

1. An electronic cash register system, comprising:
 a PLU file storing item data corresponding to different classes of articles to be processed by said electronic cash register system, said item data comprising at least a PLU code and an item price data, wherein each particular article to be processed is within one of said classes of articles and all particular articles within a same class have the same item data;
 storage means for receiving and temporarily storing item data from said PLU file, corresponding to different classes of articles processed by said electronic cash register system;
 access means for accessing said item data stored in said storage means when a present particular article being processed by said ECR system is within a same class of articles as a preceding article processed by said electronic cash register system and having its item data stored in said storage means; and
 output means, responsive to said item data accessed by said access means, for providing an output representation of at least said item price data.

2. The system as in claim 1, wherein said storage means comprises plural storage areas for storing simultaneously item data corresponding to plural ones of said classes of particular articles.

3. The system as in claim 2, wherein each of said storage areas has a counter associated therewith, said counters being incremented one count in response to an input means entering a PLU code corresponding to a class of articles the item data of which is previously stored in its associated memory area, said ECR system further comprising:
 a detection means for determining (a) whether all of said plural storage areas have item data stored therein, (b) in response to a determination that all of said plural storage areas have item data stored therein, determining one of (i) which of said counters has the lowest count and (ii) whether two or more of said counters have equally lowest counts and (c) in response to a determination that two or more of said counters have equally lowest counts, determining which memory area of the memory areas associated with the two or more counters of equally lowest count contains earliest stored item data; and an erasing means, responsive to said detection means, for erasing one of (i) the memory area associated with the single counter determined to have the lowest count, (ii) the memory areas associated with the two or more counters which have equally lowest counts, and (iii) the memory area of the memory areas associated with the two or more counters of equally lowest count which was determined by the detection means to have earliest stored item data therein.

4. An electronic cash register system, comprising:

a PLU file storing item data corresponding to different classes of articles to be processed by said electronic cash register system, said item data comprising at least a PLU code and an item price data, wherein each particular article to be processed is within one of said classes of articles and all particular articles within a same class have the same item data;

input means for entering into said electronic cash register system PLU codes of a succession of particular articles as they are being processed by said electronic cash register system;

retrieval means, responsive to entry of said PLU codes by said input means, for searching said PLU file to retrieve item data stored in said PLU file corresponding to said succession of particular articles;

storage means, responsive to said retrieval means, for receiving and temporarily storing in order said item data retrieved by said retrieval means such that item data corresponding to at least one of said particular articles is stored at any particular time;

judgment means, responsive to said input means, for determining whether a particular present article being processed is within the same class as a preceding article processed by said ECR system and having its item data stored in said storage means;

access means, responsive to a determination by said judgment means that a present article is within the same class as a preceding article, for accessing said item data relating to said preceding article stored in said storage means; and output means comprising a first means, responsive to said item data relating to said preceding article accessed by said access means, for providing an output representation of at least said item price.

5. The system as in claim 4, wherein said output means comprises a second means, responsive to a determination by said judgment means that a present article being processed is not within the same class as an article previously processed by said ECR system, for receiving item data relating to said present article retrieved by said retrieval means to provide an output representation of at least said item price data relating to said present article.

6. The system as in claim 4, wherein said input means comprises a bar code scanner means for scanning bar codes associated with each of said articles, and said judgment means further comprises comparison means, responsive to said scanner means, for comparing a PLU code of a present article with a PLU code of a preceding article, to determine whether said present article is within the same class as said preceding article.

7. The system as in claim 4, wherein said judgment means determines whether said present article is within the same class as an immediately preceding article processed by said ECR system.

8. The system as in claim 4, wherein said storage means comprises plural storage areas for storing simultaneously item data corresponding to plural ones of said classes of particular articles.

9. The system as in claim 8, wherein each of said storage areas has a counter associated therewith, said counters being incremented one count in response to said input means entering a PLU code correspnding to a class of articles the item data of which is previously stored in its associated memory area, said ECR system further comprising:

a detection means for determining (a) whether all of said plural storage areas have item data stored therein, (b) in response to a determination that all of said plural storage areas have item data stored therein, determining one of (i) which of said counters has the lowest count and (ii) whether two or more of said counters have equally lowest counts and (c) in response to a determination that two or more of said counters have equally lowest counts, determining which memory area of the memory areas associated with the two or more counters of equally lowest count contains earliest stored item data; and an erasing means, responsive to said detection means, for erasing one of (i) the memory area associated with the single counter determined to have the lowest count, (ii) the memory areas associated with the two or more counters which have equally lowest counts, and (iii) the memory area of the memory areas associated with the two or more counters of equally lowest count which was determined by the detection means to have earliest stored item data therein.

10. An electronic cash register system, comprising:

a PLU file storing item data corresponding to different classes of articles to be processed by said electronic cash register system, said item data comprising at least a PLU code and an item price data wherein each particular article to be processed is within one of said classes of articles and all particular articles within the same class have the same item data;

input means for entering into said electronic cash register system PLU codes for a succession of particular articles as they are being processed by said electronic cash register systems, said input means comprising means for providing an indication that a present article being processed is within the same class as a preceding article processed by said ECR system and having its item data stored in said temporary storage means;

retrieval means, responsive to entry of said PLU codes by said input means, for searching said PLU file to retrieve item data stored in said PLU file corresponding to said succession of particular articles;

storage means, responsive to said retrieval means, for receiving and temporarily storing in order said item data retrieved by said retrieval means such that item data corresponding to at least one of said particular articles is stored at any particular time;

access means, responsive to said indication that a present article is within the same class as a preceding article, for accessing said item data relating to said preceding article stored in said storage means; and output means comprising a first means, responsive to said item data access by said accessing means, for providing an output representatin of at least said item price data.

11. The system as in claim 10, wherein said output means comprises a second means, responsive to said input means failing to provide an indication that a present article being processed is within the same class as an article previously processed by said ECR system, for receiving item data relating to said present article retrieved by said retrieval means to provide an output representation of at least said item price data relating to said present article.

12. The system as in claim 10, wherein said input means comprises a keyboard having keys for designating a PLU code and said means for providing said indication is a repeat key for providing a signal that a present article being processed is within the same class as a preceding article processed by said ECR system.

13. The system as in claim 10, wherein said storage means comprises plural storage areas for storing simultaneously item data corresponding to plural ones of said classes of particular articles.

14. The system as in claim 13, wherein each of said storage areas has a counter associated therewith, said counters being incremented one count in response to said input means entering a PLU code corresponding to a class of articles the item data of which is previously stored in its associated memory area, said ECR system further comprising:

a detection means for determining (a) whether all of said plural storage areas have item data stored therein, (b) in response to a determination that all of said plural storage areas have item data stored therein, determining one of (i) which of said counters has the lowest count and (ii) whether two or more of said counters have equally lowest counts and (c) in response to a determination that two or more of said counters have equally lowest counts, determining which memory area of the memory areas associated with the two or more counters of equally lowest count contains earliest stored item data;

an erasing means, responsive to said detection means, for erasing one of (i) the memory area associated with the single counter determined to have the lowest count, (ii) the memory areas associated with the two or more counters which have equally lowest counts, and (iii) the memory area of the memory areas associated with the two or more counters of equally lowest count which was determined by the detection means to have earliest stored item data therein.

* * * * *